United States Patent
Mahimkar et al.

(10) Patent No.: US 10,299,140 B2
(45) Date of Patent: May 21, 2019

(54) CHANGE ROLL OUT IN WIRELESS NETWORKS

(71) Applicants: AT&T Intellectual Property I, L.P., Atlanta, GA (US); AT&T Mobility II LLC, Atlanta, GA (US); University of Texas, Austin, TX (US)

(72) Inventors: Ajay Mahimkar, Woodbridge, NJ (US); Zihui Ge, Madison, NJ (US); Nabeel Mir, Edmond, OK (US); Sarat Puthenpura, Berkeley Heights, NJ (US); Lili Qiu, Austin, TX (US); Mubashir Adnan Qureshi, Austin, TX (US)

(73) Assignees: AT&T Intellectual Property I, L.P., Atlanta, GA (US); AT&T Mobility II LLC, Atlanta, GA (US); Board Of Regents, The University of Texas System, Austin, TX (US)

( * ) Notice: Subject to any disclaimer, the term of this patent is extended or adjusted under 35 U.S.C. 154(b) by 468 days.

(21) Appl. No.: 15/223,580

(22) Filed: Jul. 29, 2016

(65) Prior Publication Data

US 2018/0035307 A1     Feb. 1, 2018

(51) Int. Cl.
*H04L 12/24*     (2006.01)
*H04L 12/26*     (2006.01)
*H04W 16/18*     (2009.01)

(52) U.S. Cl.
CPC .......... *H04W 16/18* (2013.01); *H04L 41/082* (2013.01); *H04L 41/0816* (2013.01);
(Continued)

(58) Field of Classification Search
CPC . H04L 41/0816; H04L 41/082; H04L 41/147; H04L 43/08; H04L 43/50; H04W 16/18
See application file for complete search history.

(56) References Cited

U.S. PATENT DOCUMENTS 6,272,450 B1    8/2001    Hill et al.
6,336,035 B1    1/2002    Somoza et al.
(Continued)

FOREIGN PATENT DOCUMENTS

WO    WO 2006/051343 A1    5/2006

OTHER PUBLICATIONS

Shin et al.; "Testing of Early Applied LTE-Advanced Technologies on Current LTE Service to overcome Real Network Problem and to increase Data Capacity"; IEEE 15th Intl Conf. on Advanced Communiction Technology (ICACT); 2013; 7 pages.
(Continued)

*Primary Examiner* — Diane D Mizrahi
(74) *Attorney, Agent, or Firm* — BakerHostetler

(57) ABSTRACT

An approach for change roll out in wireless networks that utilizes a diverse set of features, such as software/hardware configuration, radio parameters, user population, mobility patterns, network topology and automatically identifies the test locations that would improve the predictability between the performance impacts during testing and network-wide deployment. Through automated and effective analysis of a wide variety of features, the approach for change roll out in wireless networks reflects the impacts observed during testing and predicts the performance of the post-test wide-scale deployment.

20 Claims, 11 Drawing Sheets

(52) U.S. Cl.
CPC ............ *H04L 41/147* (2013.01); *H04L 43/08* (2013.01); *H04L 43/50* (2013.01)

(56) References Cited

U.S. PATENT DOCUMENTS

| | | |
|---|---|---|
| 8,031,627 B2 | 10/2011 | Ee et al. |
| 8,515,015 B2 | 8/2013 | Maffre et al. |
| 9,197,432 B2 | 11/2015 | Omar |
| 9,348,735 B1 * | 5/2016 | Cohen ................. G06F 11/3684 |
| 2007/0298782 A1 | 12/2007 | Wu |
| 2010/0098038 A1 | 4/2010 | Chang et al. |
| 2014/0113588 A1 | 4/2014 | Chekina et al. |
| 2014/0325278 A1 | 10/2014 | Omar |
| 2016/0014617 A1 | 1/2016 | Sofuoglu et al. |
| 2016/0210224 A1 * | 7/2016 | Cohen ................. G06F 9/44589 |

OTHER PUBLICATIONS

Mahimkar et al.; "Detecting the Performance Impact of Upgrade in Large Operational Networks"; Proceedings of the ACM SIGCOMM Conference; 2010; p. 303-314.

Mahimkar et al.; "Rapid Detection of Maintenance Induced Changes in Service Performance"; Proceedings of the Seventh Conf. on Emerging Networking Experiments and Technologies; 2011; 12 pages.

* cited by examiner

CHANGE ROLL OUT IN WIRELESS NETWORKS

TECHNICAL FIELD

The technical field generally relates to change roll out of networks and, more specifically, to systems and methods of mitigating issues with change roll out of networks.

BACKGROUND

Many users rely on cellular networks for entertainment, social activities and business critical tasks, such as stock trading, navigation, and emergency services. The phenomenal traffic growth and vast diversity in both applications and mobile devices pose significant challenges to cellular service providers. The cellular networks are extremely complex and constantly evolving at a rapid pace. Changes are introduced to either support new service features (e.g., hardware and software changes), such as voice over LTE, LTE-advanced, small cells, and software patches (e.g., for bugs), among other things. Deploying changes in a cellular network are usually done with extreme caution in order to avoid any unexpected performance degradation or failures. Extensive testing is typically conducted in large-scale laboratory settings, but it is extremely difficulty to replicate the large-scale, diverse variations and extreme complexity of real operational networks. Thus, the changes are tested on a smaller scale in the field. This small scale testing in the field is referred to as the First Field Application (FFA).

A goal of FFA testing is to identify and infer the performance impacts of the change and make a recommendation for a go/no-go decision for a network-wide roll-out. If the desirable service performance impacts (e.g., improvements or at times no change in performance) are observed after the FFA, the decision is to go-ahead with the roll-out. However, if performance degradations are observed, the changes need to be rolled back at the FFA locations and further analysis need to be conducted in lab settings.

The performance impact during FFA is carefully analyzed by the network operation and engineering teams. Once they certify the change using field test results, the network-wide roll-out begins at a rapid pace. Strict deadlines are set to quickly update the network. Any unexpected issues discovered in the network-wide roll-out would slow down the process because of the need to understand the negative performance impact during FFA. This can occasionally happen because of the large scale network, diversity of network equipment, complex topology, multiple technologies, transport architectures, and dependency of service performance on external uncontrollable factors. Thus, careful planning and design of field tests is important to ensure smooth roll-out for the network-wide deployment.

Cellular networks are constantly evolving due to frequent changes in radio access and end user equipment technologies, dynamic applications and associated traffic mixes. Network upgrades should be performed with extreme caution since millions of users heavily depend on the cellular networks for a wide range of day to day tasks, including emergency and alert notifications. Before upgrading the entire network, field evaluation of upgrades may be conducted. Field evaluations are typically cumbersome and can be time consuming; however if done correctly can help alleviate many of the deployment issues that are associated with service quality degradation.

SUMMARY

The choice and number of field test locations may have a significant impact on the time-to-market as well as confidence in how well various network upgrades will work in the rest of the network. Disclosed herein are methods, systems, and apparatuses, for determining where to conduct upgrade field tests in order to accurately identify significant features that affect a change in a network. Disclosed herein is the consideration of automated test location selection for network changes.

An approach for change roll out in wireless networks that utilizes a diverse set of features, such as software/hardware configuration, radio parameters, user population, mobility patterns, network topology and automatically identifies the test locations that would improve the predictability between the performance impacts during testing and network-wide deployment. Through automated and effective analysis of a wide variety of features, the approach for change roll out in wireless networks reflects the impacts observed during testing and predicts the performance of the post-test wide-scale deployment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects of the herein described telecommunications network and systems and methods for antenna switching based on device position are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. When practical, like numbers refer to like elements throughout.

DETAILED DESCRIPTION

Figure 1:
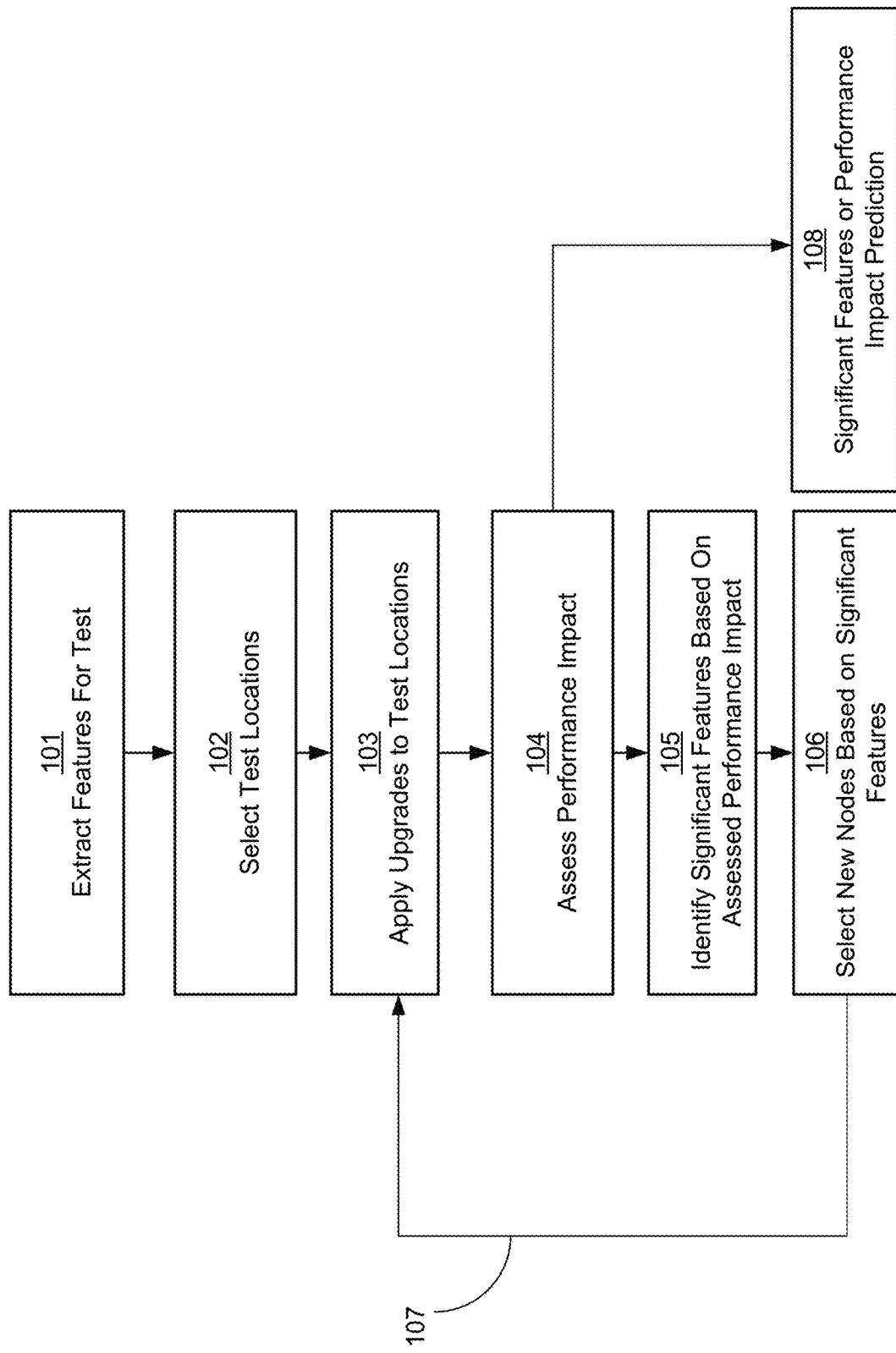
FIG. 1 illustrates an exemplary method for change rollout of wireless networks.

Cellular networks are constantly evolving due to frequent changes in radio access and end user equipment technologies, dynamic applications and associated traffic mixes. Network upgrades should be performed with caution since millions of users heavily depend on the cellular networks for a wide range of day to day tasks, including emergency and alert notifications. Before upgrading the entire network, field evaluation of upgrades may be conducted. Field evaluations are typically cumbersome and can be time consuming; however if done in the way as described herein, deployment issues, such as service quality degradation, may be alleviated.

A major challenge faced by network operations and engineering teams in the planning and design of field tests is what selection criteria to employ for selecting the network elements to be used for the field tests? This is an important and unique challenge arising from the tremendous diversity in cellular networks. Here are two illustrative real-world examples to highlight this diversity. In a first example, approximately 250 configuration parameters across 8000 LTE base stations were analyzed to observe that there are 747 unique clusters where each cluster is identified by a unique combination of configuration values. The cluster size distribution is not skewed, which is illustrative of diverse configuration settings across multiple base stations. In a second example, in a software upgrade case, different base stations had different performance impacts. Some base stations had improvements after the upgrade whereas others had no impact. The cause for the contrasting performance impact for the same trigger (software upgrade) varied.

Disclosed herein is a new approach for change roll out in wireless networks that utilizes a diverse set of features (e.g., software/hardware configuration, radio parameters, user population, mobility patterns, network topology) and automatically identifies the FFA test locations that would improve the predictability between the performance impacts during FFA and network-wide deployment. Having predictable performance behaviors with FFA allows for a smooth and rapid wide-scale roll-out. Through automated and effective analysis of a wide variety of features, the disclosed approach for change roll out in wireless networks (herein change rollout method) reflects the impacts observed during FFA and predicts the performance of the post-FFA wide-scale deployment.

Designing the change rollout method requires the following technical challenges to be addressed: (i) very large search space, (ii) interactions between features, and (iii) very low sampling for FFA locations. With reference to large search space, there are tens of thousands of cellular base stations or other wireless nodes (e.g., eNodeBs in LTE) to choose from, each with hundreds of features. Which features to consider and which nodes to test have significant impact on the accuracy and predictability of the tests. Given N features and each can take k values, it generate $k^N$ test cases. For example, N=100 and k=2 (binary features) generates around one million test cases, which is already not practical for operational networks. With reference to interactions between features, for conventional systems it is often not possible to know in advance which features will interact negatively with a new network change. For example, a software upgrade on an eNodeB may interact negatively with a radio link failure timer on a neighboring eNodeB and this impact may only be observable when applied in the field. It is difficult to have a-priori knowledge about this negative interaction. Ideally we should automatically discover this undesirable interaction based on the limited FFA tests, and resolve the issue before the network-wide roll-out.

With reference to very low sampling for FFA locations, since one of the goals of FFA is to minimize the risk of negative impact on network locations, the network operations and engineering teams have a very low sampling budget. For example, for ten thousand eNodeBs, the number of locations available for FFA testing may only be 100, yielding a sampling rate of 1%. Given such a low sampling rate and the wide-variety of features, it becomes challenging to identify the appropriate set of locations for FFA with high predictability during network-wide roll-out.

One way to design test cases is to diversify all features (e.g., for each feature, select test case that involves different values of that feature). However, the number of test cases grows exponentially with the number of features, which may be prohibitively expensive. In practice, only a small number of features are significant to the performance, and conventionally these significant features may not be known in advance.

The change rollout method discussed herein is a multi-phase test plan. During the first phase, nodes that offer the best coverage over a significant number of features (e.g., all features) are identified. Next the impact of each of the originally selected significant number of features is assessed. This assessment narrows down the originally selected significant number of features to a smaller subset of candidate features that are likely to be important. During the subsequent phase, only these candidate features are tested by selecting nodes that offer the best coverage over the candidate features so that there is further narrowing to a final set of features that are consider important. With the disclosed method for change roll out, the number of test cases may be significantly reduced The test cases enable better selection of locations and increased likelihood of capturing the impact on a smaller number of locations.

When features are determined to be important, a degradation probability may be determined for each combination of significant features (e.g., for K significant features that take binary values, we derive degradation probabilities for $2^K$ significant feature combinations: from 00 . . . 0 to 11 . . . 1). Then the degradation probability of an untested location may be predicted by classifying it into one of $2^K$ significant feature combinations and applying the previously derived degradation probability to make a prediction. The change roll out method supports non-binary features, as well.

The multi-phase test planning approach allows for more effective design of tests, because performance at different eNodeBs with different feature values is known. Thus, instead of designing complete tests in advance and conducting all tests in one shot, the performance outcome from previous tests are used to guide the design of subsequent tests. This multi-phase test planning is practical since major wireless service providers schedule FFA in a staggered manner. The reason behind staggered roll-out is that hundreds of thousands of base stations usually cannot be upgraded on a single day and rolling out the upgrade over multiple days also enables the operation teams to carefully monitor their performance impacts. Thus, future tests may be designed using the information gained via performance impact assessments from the previous tests.

In order to realize the multi-phase test plan, the following questions should be answered: (i) what features should be used for test planning and performance analysis; (ii) how to prepare inputs for both test planning and analysis of contrasting performance impacts; (iii) how to determine the initial test locations; (iv) how to determine the performance impacts; (v) how to diagnose the contrasting performance in the previous test; and (vi) how to use the analysis results of the previous tests to design future tests. Disclosed herein are answers to those questions.

FIG. 1 illustrates an exemplary method for change rollout of wireless networks, as discussed herein. In summary, with more details disclosed herein, at step 101 features are extracted for a first phase test. At step 102, test locations (e.g., nodes or clusters) are selected. At step 103, upgrades are applied to the selected test locations of step 102. Although, upgrades are discussed any significant planned change is contemplated. Upgrades can be of the form: software version changes, firmware upgrades, configuration changes, or equipment re-homes. At step 104, performance impact of upgrade on nodes is assessed. At step 105, significant features based on assessed performance impact are identified. At step 106, new nodes for a second (or subsequent phase) are selected based on the significant features of step 105. At step 107, repeat process starting at step 103 for second phase. At step 108, the process may be stopped for a particular upgrade (e.g., software patch 1.0) and significant features associated with performance (degradation or improvement) or predictions of performance impact may be provided.

Figure 2:
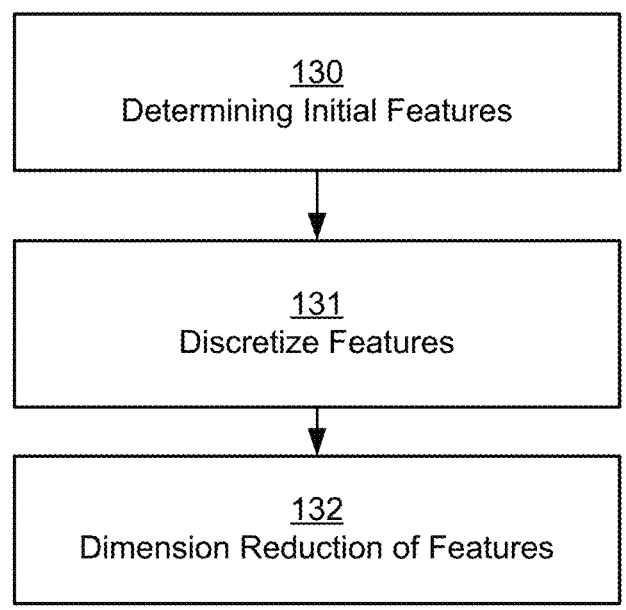
FIG. 2 illustrates an exemplary method associated with FIG. 1 associated with change roll out.

As stated herein, step 101 provides the list of features that may be considered in a first phase of testing. FIG. 2 provides further illustration of the method step 101 of FIG. 1. At step 130 there is feature extraction. Feature extraction may include assembling a plurality of parameters that may affect performance of a wireless communication, which may be associated with a base station (e.g., eNodeB 1020 or base station 616), a mobile device (e.g., mobile phone, tablet, or laptop—WTRU 602), a router (e.g., BGR 832), or another portion of a communication network (e.g., telecommunication system 600). Features may be based on information in configuration files of the devices disclosed herein or measurement information (e.g., operations, administration, and maintenance (OAM) information or quality of service information). Features may include number of users, handover associated information, or signal strength, among other things. Features may be grouped into the following exemplary categories: node-level features, protocol-level features, topological features, or location centric features.

With regard to node-level features, which may consider node-level configurations, examples include software version, hardware version, device manufacturer, capacity of radio link, carrier frequencies supported by a device, physical resource block capacity, and backhaul configuration. With regard to protocol-level features, it may be associated with a protocol stack, such as the E-UTRAN protocol. There are three layers in the LTE protocol stack. The physical layer (Layer 1) takes care of link adaptation, power control, cell search (synchronization and handovers), or transport over an air interface. Layer 2 may include MAC (Medium Access Layer), RLC (Radio Link Control), and PDCP (Packet Data Convergence Protocol). Radio resource control (RRC) manages the radio resources including paging, establishment and termination of radio connection between users and E-UTRAN, and management of radio bearer connections with the core network. In real-world experiment, protocol-level associated values were collected across the layers on a daily basis.

Topological features may be associated with logical connectivity between nodes, such as logical connectivity between a base station and Mobility Management Entity (MME) or neighbors for a base station (also referred to as X2 link in LTE). Topological features often include metrics that affect service performance experienced by end-users from end-to-end. Service performance may be impacted by the radio access network (RAN), the core network, or user equipment (UE). Topological features for a base station may include the configuration attributes (such as software version, or hardware) on an upstream connected switch or mobility management entity (MME).

Location-centric features may include metrics associated with user mobility, radio channel quality, or user traffic demand, among other things. User mobility metrics may be based on handover measurements, relative signal strength indicator (RSSI), uplink noise, block error rate (BLER), or channel quality indicator (CQI), among other things. User mobility metrics may also be based on user traffic demand using the number of RRC connections, uplink and downlink PDCP volumes, or physical resource block utilizations. Features associated with locations may be quantized and considered. For example, metrics may differentiate a binary (or other fashion) as shown in the following: (i) business versus residential locations (e.g., business=0 or business=1), (ii) venue versus non-venue locations (e.g., venue=0 or venue=1), or (iii) terrain type, such as tall buildings, mountains, flat surface, and user population densities (e.g., population density=0/1/2, which may correspond to rural, suburban, and urban). Venues locations are usually locations where an organized event such as a concert, conference, or sports event may occur. Venues may have very low traffic for most time intervals, but often have a dramatic surge during events.

With continued reference to step 101, step 131 and step 132 of FIG. 2 may be considered input preparation before for the first phase of implementation of upgraded software. At step 131, feature values may be discretized. Most of the features in the example traces are binary. Trace refers to the data set that has been collected, often by a service provider. For example, configuration parameter such as VoLTE enabled or disabled. The remaining features may take textual values (e.g., Software version on a base station—version 13.1, 13.2, 14.1, 15.1) or real numbers. To ease diagnosis and test planning, textual features are mapped to numerical values, where features that have similar texts have smaller difference in numerical values (e.g., Windows OS 7 and 8 are mapped to numbers next to each other, whereas Windows and Linux are mapped to more separated numbers). In an example, feature X may equal 0, 1, or 2, which may correspond to low, medium, and high. Thresholds may be used to determine high, low, or the like, but alternatively user judgement may be used as well. In addition, a real numbered feature may be discretized by comparing it with mean−2*std and mean+2*std to map to one of the three levels: 0, 1, 2, where both the mean and standard deviation (std) are computed using values across a plurality of eNodeBs (or other devices), which may be network wide or a subset of eNodeBs.

At step 132, there may be dimension reduction in order to reduce the number of features. Features may be clustered into equivalence classes, which may address multiple issues. First, the impact of two features may not be differentiated if (i) they almost always change together and (ii) for each value of feature f1, there is a unique value for feature f2. For example, consider two features f1 and f2. When they take 00, performance improves. When they take 11, performance degrades. The traces do not have instances with the feature values of 01 or 10. In this case, it cannot be determined whether performance degradation is due to f1=1 or f2=1 or (f1=1 and f2=1). Second, clustering features reduces the number of unknowns, which may improve accuracy or running time.

With continued reference to step 132, to accommodate such inherent ambiguity as well as improve accuracy and speed, features into equivalence classes. Strictly speaking, two features may be considered indistinguishable (or equivalent) whenever there is always one unique value of f2 for each value of f1 and vice versa. In practice, this condition is relaxed to allow occasional violations as long as in most cases there is one unique value of f2 for each value of f1 and vice versa. By definition, the equivalence relationship is symmetric (i.e., if f1 is equivalent to f2, f2 is equivalent to f1). It is also transitive (i. e., if f1 and f2 are equivalent and f2 and f3 are equivalent, then f1 and f3 are equivalent).

Below is an algorithm to identify the equivalent classes. For a pair of features fi and fj, each of their value combinations is evaluated to compute the following metric called unique ratio, discussed below. So, for each value fi takes, say $v_{i,k}$, how many unique values fj takes is examined and the number of nodes that take these values and compute the unique ratio:

$$\left( \frac{\sum_k \max_l N(v_{i,k}, v_{j,l})}{\sum_k \sum_l N(v_{i,k}, v_{j,l})} + \frac{\sum_l \max_k N(v_{j,l}, v_{i,k})}{\sum_l \sum_k N(v_{j,l}, v_{i,k})} \right) / 2. \quad (A)$$

N (vi,k, vj,l) is the number of nodes that take the k-th value in feature i and takes the l-th value in feature j. The most popular value $v_{j,l}$ is determined that feature j takes when feature i takes the k-th value. Most popular value may be considered the common set of values. For example, a significant fraction of base stations may be on software version 14.1—which it makes it popular. maxlN ($v_{i,k}$, $v_{j,l}$) is the number of nodes whose feature j takes the most popular value l under $v_{i,k}$. Collectively, the numerator in the first term of the above equation A reflects the total number of nodes taking the most popular feature values $v_{j,l}$ normalized by the total number of nodes from the perspective of feature i. The second term of equation A computes the same quantity from the perspective of feature j. Normalize by 2 to get the mean, since the equivalence relationship should be symmetric.

Let's consider two features for an example. Across all nodes over time, it is found that 00 in the two features occurs 90% of the time, 01 for 2% of the time, 10 for 5% of the time, and 11 for 3% of the time. Below is the result based on the use of equation A:

$$\left( \frac{90\% + 5\%}{100\%} + \frac{90\% + 3\%}{100\%} \right) / 2 = 0.94. \quad (B)$$

When the unique ratio is higher than a threshold, the two features are declared equivalent. The threshold should be high enough so that features that are almost identical are grouped. Although any reasonable threshold may be set, the preferred threshold is 0.98.

With reference to FIG. 1, at step 102, first phase test locations are selected. This may be based on hamming distance. The change roll out method discussed herein diversifies over several features and identifies a smaller set of features that are likely to matter. Step 012 may quickly prune irrelevant features and narrow down a list of several features (e.g., as created in step 130-132) to a smaller set of candidate features. At step 102, feature values are selected that maximize the minimum hamming distance among them. Minimum hamming distance is used as the optimization metric because it captures how many features whose impact may be assessed (e.g., if we select feature values: 000 vs. 111, we can assess the impact of three features by comparing the performance when each feature takes a value 0 versus 1). Specifically, first randomly select a feature value combination to test. In the next iteration, we add a feature value combination that has the largest hamming distance from the one selected earlier. For hamming distance based selection, consider you have feature combination ABCDEFGH, where each letter represents feature values. Cluster 111, cluster 112, and cluster 113 have the following respective feature combination (ABCDEFGH): 10101010; 11000001; and 01010101. Again, each digit represents feature values. Each cluster is identified by a unique combination of features values, such as hardware or software configuration values. Further assuming, that we have cluster 111 with 10101010 as our testing cluster already, the next added cluster maximizes the minimum hamming distance over the clusters that are already added. For cluster 112 with 11000001, hamming distance with cluster 111 with 10101010 is 5 and for cluster 113 with 01010101, hamming distance is 8. So cluster 113 with 01010101 is chosen as another cluster to test in phase 1. Then repeat the process to select the desired number of clusters (and nodes) which may be based on a testing budget. In another example, if a feature combination 00 is first selected. Then it is preferable to select a feature combination 11 instead of 01 or 10. This is because it allows us to estimate impact of two features by computing the difference between when one feature takes a value 0 versus takes a value 1. Note that this comes with a caveat, which assumes that the impact of the interaction between the two features, in the previous example, is likely to be smaller than the impact of an individual feature, which is likely to hold in practice.

In the third iteration, a feature combination is picked that maximizes the minimum hamming distance from the two we picked so far: max $min_t$ hamming ($n_t$, n'), where $n_t$ are the set of feature combinations already selected and n' denotes the new feature combination to add. This is iterated until enough eNodeBs are selected to do a phase 1 test. In order to compute degradation probability, multiple nodes may be selected from each feature combination (e.g., each cluster). For example, three nodes per feature combination may be sufficient.

With continued reference to step 102, to further improve the performance, instead of randomly selecting one feature value (e.g., 0000) in the first iteration, it may be helpful to select a value whose numbers of 1's and 0's are similar. For example, 1100101—this has three ones (1) and three zeros (0). This is because in real traces not all feature values are possible and balanced numbers of 0's and 1's make it easier to diversify the feature values in the subsequent iterations (since we can diversify by getting features that change from 0 to 1 or change from 1 to 0).

A number of other extensions in the same framework may be supported. For example, the hamming distance may be weighed by the importance of a feature. The weight can reflect either the popularity of a feature value (i.e., the number of eNodeBs that take the feature value) or the priority of a given feature based on prior knowledge/historical data (e.g., traffic and signal-to-noise ratio (SNR) tend to be more significant than other features). The priority of a feature (e.g., the importance or significance of a feature) may be determined based on thresholds or user rank. For example, historical test data may show that SNR has been the feature that has shown up on the list of features that see issues when an upgrade occurs three of the last five upgrades. A threshold hold may be set that if the feature is present in at least two of the last five upgrades it has a higher (or lower) weight.

With reference to step 102, Bayesian experimental design may be used to select nodes, instead of selection based on hamming distance. Bayesian experimental design may improve the statistical inference about the quantities of interest by selecting control variables. Below is further discussion of selection of nodes (e.g., eNodeBs) in Bayesian framework. x is a vector denoting the impact of each feature, and y is a vector denoting each base station's performance. The base station performance may be approximated in a linear regression as $y_S = A_S x$ where $y_S$ and $A_S$ are the performance and features of the base stations selected for testing changes. A goal is to select $\eta^*$ from the set H to maximize the expected utility of the best terminal decision $U(\eta)$ (i.e., estimate of quantity of interest). $U(\eta^*)$ is defined as:

$$U(\eta^*) = \max_{\eta \in \mathcal{H}} \int_y \max_{d \in D} \int_x U(d, x, \eta, y) p(x \mid y, \eta) p(y \mid \eta) dx dy \quad (C)$$

where $p(\bullet)$ is a probability density function for a given measure.

There are different variants of Bayesian design. Bayesian A-optimal design is the most appropriate for purposes discussed herein. It minimizes the squared prediction error for locations including untested locations:

$$\|Fx - Fx_e\|_2^2 = (Fx - Fx_e)^T(Fx - Fx_e)$$

So a design $\eta$ may be chose to maximize the following expected utility:

$$U_A(\eta) = -\int (Fx - F\hat{x})^T (Fx - F\hat{x}) p(y, x \mid \eta) dx dy,$$

where $\hat{x}$ is the estimated x under the best decision rule d.

We assume a Gaussian linear system, i.e., $ySIx, \sigma2 \sim ASx + N(0, \sigma^1 I)$, where $\sigma2$ is the known variance for the zero mean Gaussian measurement noise, and I is the identity matrix. Suppose the prior information is that $x \mid \sigma2$ is randomly drawn from a multivariate Gaussian distribution with mean vector $\mu$ and covariance matrix $\Sigma = \sigma^2 R-1$, where $\mu$ and matrix R are known a priori.

$D(\eta) = (A_S^T A_S + R)^{-1}$. The Bayesian procedure yields $UA(\eta) = -\sigma^2 \text{tr}\{FD(\eta)F^T\}$, where $\text{tr}\{M\}$ (the trace of a matrix M) is defined as the sum of all the diagonal elements of M. Maximizing $UA(\eta)$ reduces to minimizing $\varphi_A(\eta) = \text{tr}\{FD(\eta)F^T\}$, which is the Bayesian A-optimality.

At step 103, the upgrade is applied to the chosen nodes of step 102. Subsequent to the implementation of the upgrade (e.g., change in hardware or software), at step 104 the performance of the chosen nodes (or clusters) are determined. Generally, the impacts of network changes may be monitored using a wide variety of service performance indicators. An expected performance impact (an improvement or no degradation) ensures good quality of service provided to the end-users. On the other hand, if there is performance degradation after the network upgrade, a rollback to the previous configuration may be implemented to minimize the service disruption. Statistical techniques such as Mercury (See A. Mahimkar, H. H. Song, Z. Ge, A. Shaikh, J. Wang, J. Yates, Y. Zhang, and J. Emmons. Detecting the performance impact of upgrades in large operational networks. In *Proc. of ACM SIGCOMM,* 2010, which is incorporated by reference in its entirety) and Prism (See A. Mahimkar, Z. Ge, J. Wang, J. Yates, Y. Zhang, J. Emmons, B. Huntley, and M. Stockert. Rapid detection of maintenance induced changes in service performance. In *Proc. of ACM CoNEXT,* 2011, which is incorporated by reference in its entirety) provide automated ways to detect the impact. An application using Mercury or Prism may automatically extract the performance indicator for each eNodeB about whether its performance improves, does not change, or degrade after an upgrade. The following service performance metrics may be used in the application to capture the statistical changes in behaviors: (i) accessibility—the ratio of successful call establishments to total call attempts, (ii) retainability—the ratio of successful call terminations to total calls, and (iii) data throughput—a measure of bits per second delivered to the end-users. Unless otherwise specified, a node degrades if the metrics accessibility, retainability, or data throughput satisfy the following condition:

$$\frac{P_{before} - P_{after}}{MAD} > \text{threshold} \quad (D)$$

$P_{before}$ and $P_{after}$ denotes the median performance during a certain amount of days before and after the upgrade, respectively, MAD stands for mean absolute deviation during the days before the upgrade, which is defined as $$\frac{1}{n} \sum_i \|x_i - \text{mean}(x)\|,$$

and threshold=3. It was found that 14 days each for $P_{before}$ and $P_{after}$ worked well in experiments, but another amount of days (e.g., 13 days) may be selected.

At step 105, determine features that impact performance based on the received performance metrics of step 104. Generally, the performance results are obtained from the first phase of testing of base stations (e.g., eNodeBs) and the nodes that are observed to have contrasting performance are identified, as well as the significant features that may affect the network upgrade. More specifically, if there are contrasting impacts for the same type of upgrade, but across different network locations, the root-cause or distinguishing factor is identified that may best explain the contrast.

With continued reference to step 105, additional context is given below to the problem. Each eNodeB may be characterized by N features. A goal is to identify a subset of features that may best explain the contrasting performance outcome after the same upgrade (i.e., some eNodeBs improve their performance while others degrade). Degradation is a probabilistic event. Even when two nodes take identical values in all features, one may degrade while the other may improve. Degradation probabilities may be used for various feature value combinations for diagnosis. Specifically, for each unique feature value combination, degradation probability is computed based on traces.

For example, when there are two binary features f1 and f2, the degradation probabilities are computed when they take 00, 01, 10, and 11, respectively. Then there is a determination of which subset of features may best separate the high degradation probabilities from low degradation probabilities. Suppose the degradation probability are 0.1, 0.1, 0.9, 0.9 when f1 and f2 take values 00, 01, 10, and 11, respectively. Then f1 is the preferred selection since it has larger performance impact when f1 takes 0 versus 1 (i.e., 0.1 versus 0.9). In comparison, when f2 takes different values, the resulting performance is the same. This example looks simple, but in practice the scenarios are much more complicated due to many more features and the interactions between some features. Moreover, it is insufficient to pick features with the largest performance difference when they take value 0 versus 1, since multiple features may capture the same effect, and after selecting one feature, the effect of the remaining features may change.

Major questions in diagnosing upgrade performance issues may include: (i) what metric may best capture the notion of separation between degradation probabilities, and (ii) how to design an efficient algorithm that can handle large N, since N may be a few hundred features in our traces and it may be cost prohibitive to try all possible combinations.

There are a number of well-known algorithms to consider. For example, chi-squared test is used to determine if two events are independent. One way to apply chi-squared test to diagnosis is to test the dependence between the degradation probability versus a given feature, and select the most dependent features. Information gain measures the importance of an attribute. It is used to decide the ordering of attributes in a decision tree. Fisher score finds a subset of features such that in the data space spanned by the selected features, the distance between data points in different classes are as large as possible while the distance between data points in the same class are as small as possible. Linear regression may also be applied to diagnosis. We form a matrix A based on the unique feature values and form a vector b based on the corresponding degradation probabilities. To learn the importance of each feature, a linear equation: Ax=b is constructed, where $x_i$ is the weight of the i-th feature and x may be solved based on the linear equation. Often there are not enough observations to uniquely solve x. To address the under-constrained problem, one can further incorporate regularization terms. Ridge regression incorporates $L_2$ norm regularization and lasso regression incorporates $L_1$ norm regularization.

The accuracy of these conventional algorithms is limited especially when the root cause contains multiple significant features. A closer look of the results reveals several significant limitations. First, they rank order the features based on a certain metric, and pick the top ranked few features. But there can be significant correlation among these features, so a feature that is ranked among the top may not capture new information. Therefore, as discussed herein, the algorithm should be revised to make them iterative and remove the impact of the previously selected features before picking the next significant feature. Second, the conventional metrics fall short. For example, the chi squared test fails to take into account different sample sizes in different feature values. It performs poorly when one of the feature values (say 00) has many instances but another feature value (say, 11) has very few instances. Both information gain and fisher scores are biased towards a feature that has more diverse values. For example, suppose most features take two values and one feature takes 10 values. The feature with 10 values tends to be picked as the root cause since its information gain and fisher score tend to be higher. Linear regression accuracy is also limited due to (i) dependence between the features, (ii) non-linear relationship between the features and degradation probabilities, and (iii) significant under-constrained systems, making it difficult to accurately estimate the feature weights.

With continued reference to step 105 of FIG. 1, contrary to existing approaches, as discussed herein, an iterative algorithm (hereinafter greedy algorithm) is used to analyze the contrasting impact associated with change roll out. For each unique feature value combination, the degradation probability may be computed using traces. Generally, a trace program is a computer program that performs a check on another computer program by exhibiting the sequence in which the instructions are executed and usually the results of executing the instructions. As discussed, the contrasting impact approach iteratively adds one feature at a time to optimize a metric. To start with, it computes a metric for each feature and selects the one that optimizes this metric. Then it fixes this feature, and iteratively adds one feature at a time so that the new feature in conjunction with the previously selected features optimizes the metric. It iterates until adding a feature does not significantly improve the metric. A metric is based on z statistics:

$$\frac{\sum_i \sum_{j \neq i} |z_{ij}|}{\|\#regions\| \times (\|\#regions\| - 1)}, \quad (E)$$

where $$z_{ij} = \frac{p_i - p_j}{\sqrt{p_{ij}(1 - p_{ij})(1/n_i + 1/n_j)}}$$

and $$p_{ij} = \frac{x_i + x_j}{n_i + n_j},$$

i and j denote one of the feature combinations defined by the currently selected features (e.g., 00, 01, 10, 11 for two binary features), #regions is the total number of regions defined by the selected features (e.g., two binary features define 4 regions: 00, 01, 10, 11), $x_i$ and $x_j$ are the number of degraded eNodeBs for the i-th and j-th feature combinations, and $n_i$ and $n_j$ are the corresponding total number of eNodeBs.

The metric captures the average difference between the z scores across all regions defined by the selected features. Significant features yield larger difference in the degradation probabilities across different regions defined by the selected features. But instead of directly using probability difference, the probability difference is weighed based on the number of samples in the cluster since a large difference under a small sample size does not mean much but the same difference under a large sample size means more. An advantage of the metric is that it captures statistical significance of the derived probabilities.

To apply the greedy algorithm with this metric, first add the feature $f_{k1}$ that maximizes the metric when it takes different values (e.g., 0 versus 1). Then add a second feature $f_{k2}$ that yields the maximum difference when these two features take different values (e.g., 00, 01, 10, 11). Iterate until the difference across different regions does not increase significantly. When adding a feature does not decrease the difference across different region (e.g., when the distance improvement is less than a threshold), the process is stopped.

At step 106, nodes are selected for the second phase, a subsequent phase of testing. Preferably the nodes are different than the nodes selected in the first (previous) phase. After the performance results are analyzed and potentially significant features are narrowed down, the subsequent phase in testing tries to leverage the identified significant features to refine selection. There may be two or more phases. The second and other subsequent phases essentially use the same procedure as the initial phase. Hereinafter second phase is used interchangeably with subsequent phase. The second phase also employs a similar greedy algorithm that maximizes the minimum hamming distance between selected nodes. There are two main differences between the first and second phases. First, since the first phase already narrows down to a subset of candidate features, the second phase primarily diversifies over these candidate features (e.g., maximizes the minimum hamming distance in the candidate features and ignores the hamming distance in the other features). Second, the second phase should add new nodes to test, which may complement the nodes already tested during the first phase. This may be achieved by selecting a new feature value that maximizes the minimum hamming distance from all the selected nodes so far, including those selected in the first phase and the previous iterations of the second phase.

Step 107 leads to step 103 for iteration, in which the upgrade is applied to the chosen nodes of step 106. After testing on nodes selected during the second phase, at step 108, the diagnosis algorithm is run, which is similar to step 105. Note that by now the performance outcomes are seen from nodes selected in multiple test phases (e.g., all nodes in all test phases), so the performance information from the multiple test phases are used in step 108 as input to identify significant features that contribute to the performance difference. A significant difference is that the intermediate diagnosis steps use a lower improvement threshold to pick more features and avoid missing significant features for designing future tests whereas the final diagnosis step uses a higher threshold since it should produce the final root causes and false positive is as important as recall. Based on evaluations it was preferable to use 0.005 during the intermediate diagnosis (e.g., first phase) and 0.03 during the final diagnosis (e.g., second phase). The final root cause may be the feature with the highest probability. An output of step 108 may be the probability of degradation generally (e.g., quality of service of system) or probability of degradation for a feature (e.g., threshold SNR or using a particular version of a mobile device), among other things.

Update trigger—Analysis of contrasting performance exploits the difference in performance and feature values (e.g., after an upgrade, most of the nodes with a feature of value 0 see performance improvement, whereas most of the nodes with a feature of value 1 see degradation). However, in our measurements sometimes all nodes have the same value in a feature, and then all change to another value for the same feature upon application of update. Among these nodes, some see improvement while others see degradation. At the first glance, one may think this feature is irrelevant, since nodes with the same value in the feature see different performance. But in practice, this feature could be relevant and the degradation could be due to interaction between this feature and some other features.

In further consideration of update triggers, to systematically handle such cases, whenever there is performance degradation somewhere after the upgrade, the features that changed during the upgrade are considered as possible triggers to the performance issues. For the features that take different values across different eNodeBs at a given time, we can rely on the algorithm with regard to step 105 to identify them. So we prune these features from the trigger set. This is because if they do matter, they will be selected by our diagnosis algorithm. Only those features that changed during the upgrade and take uniform values across different eNodeBs remain in the trigger set. Then we apply the diagnosis algorithm with regard to step 105 to identify root causes. So our diagnosis result will include the trigger set and root cause, where the trigger set contains a subset of features that changed during the upgrade and the root cause contains the equivalence classes of features that best explain the contrasting performance.

Figure 3:
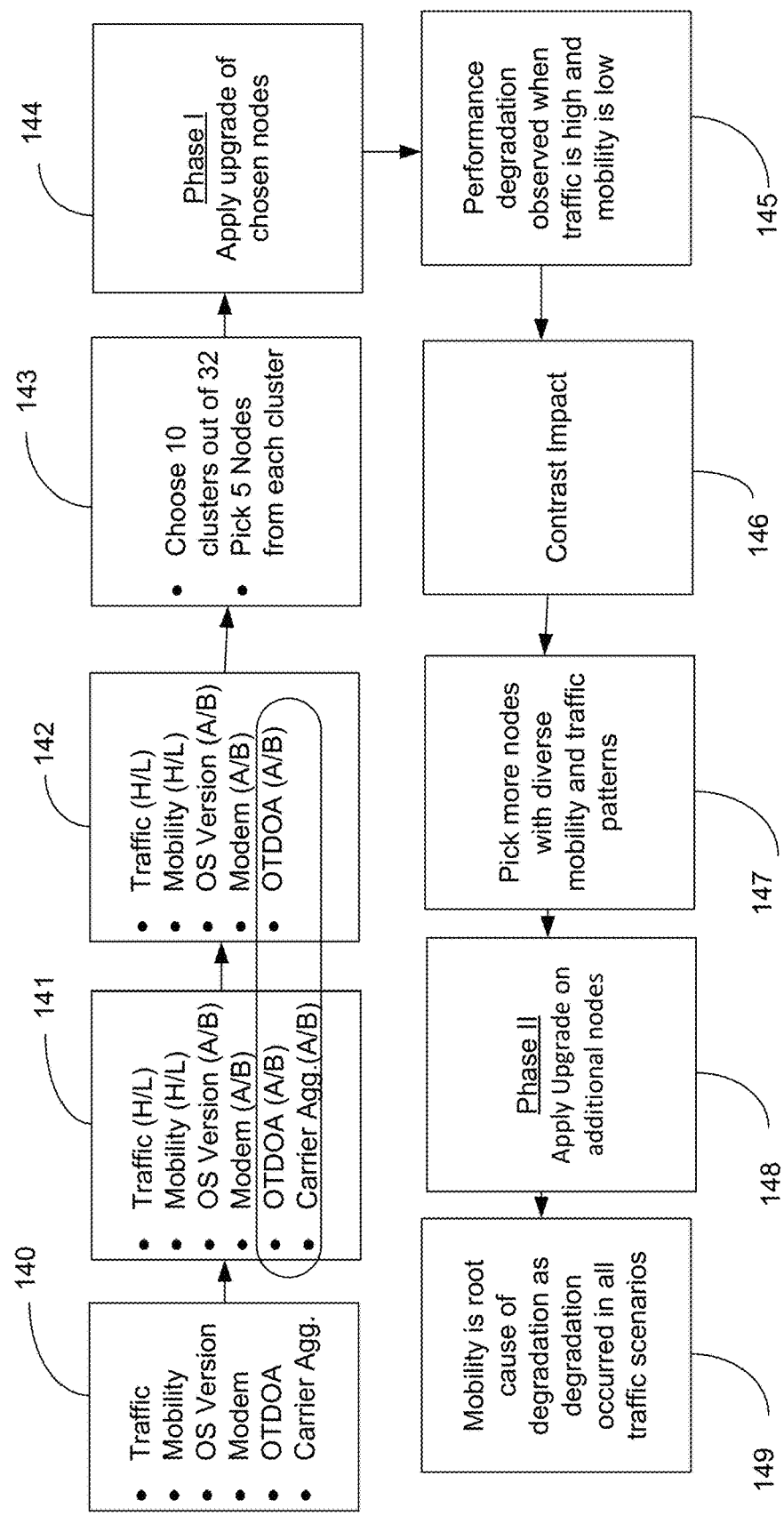
FIG. 3 illustrates an exemplary use case for the method of FIG. 1 associated with change roll out.

FIG. 3 illustrates an exemplary use case for the method of FIG. 1 associated with change roll out. At block 140 a list of features are selected (see step 130) that include traffic, mobility, OS Version, modem, OTDOA, or carrier aggregation. At block 141 (see step 131), the list of features of block 140 are discretized. In this case it is binary numbers, but can be other numerical values. Here traffic is either high=1 or low=0. In another example, the OS version may be either A=1 or B=0. At block 142 (see step 132), there is dimension reduction. Carrier aggregation and OTDOA have similar behavior so they are grouped as one to decrease dimensionality. At block 143 (see step 102), select the nodes, which may be based on budget. Choose 10 clusters out of 32. Then pick 5 nodes from each cluster. At block 144 (see step 103), apply upgrades in first phase (Phase I) on chose nodes of block 143. At block 145 (see step 104), assess performance of chosen nodes. Performance degradation may be observed when traffic is high and mobility is low. At block 146 (see step 105), identify significant features (contrast impact). At block 147 (see step 106), select new nodes based on significant features and performance. Refine the root cause and increase confidence by testing more nodes. Pick more nodes with diverse mobility and traffic patterns. At block 148, (see step 107), go on to next phase. Apply upgrade on additional nodes and test appropriately. At block 149 (see step 108), provide determinations of cause of issues, performance prediction, or the like. Here, mobility is root cause of degradation as degradation occurred in all traffic scenarios.

The change roll out method was evaluated in real world experiments. In an example, change roll out method was evaluated using one-year data collected from a major cellular service provider in US. Exemplary results show that change rollout method may test 2% nodes to identify the features that affect degradation and accurately predict the performance outcome of the remaining 98% untested nodes. There have been additional evaluation using synthetic traces by varying each parameter that confirm the effectiveness of change roll out method as discussed herein.

Case Study I: Hardware updates in the core. We started with hardware update being applied in the core network at the Mobility Management Entity (MME). MME in the LTE network manages multiple cell towers and is responsible for processing the signaling information between the end-user and core network. After the hardware change, we observed that there was an increase in a particular type of alarm across a small number of cell towers but not everywhere. Our diagnosis discovered that the software version on the cell towers was the explanation. A specific software version had conflicting interactions with the new hardware controller in the MME and caused the increase in the number of alarms. Our algorithm identified controller type as the trigger, and OS version as the root cause for raising alarms on MMEs, which agrees with the ground truth from the operation teams. It further derives the degradation probability of 0.83 in OS version 1 and 0.55 in OS version 2.

Case Study II: Software upgrade on LTE cell towers. The fourth case study came to us before the operation team know the ground truth. We applied our algorithm to understand the contrasting service performance impacts resulting from a software roll-out on LTE cell towers in a specific region. There was an increase in connection establishment failure rate at only a small number of cell towers. Our algorithm automatically identified cell towers that were congested had the performance degradation, whereas others had no negative impacts. Congestion on the cell towers was because of a multi-day high traffic special event scenario which coincided with the day of the software upgrade. Our results helped the operation team. After further investigation, they confirmed the issue occurred because of high traffic during holidays. This shows our approach is valuable to network operation.

Case Study III: Software upgrade on LTE cell towers. In our final case study, we applied our methodology on software upgrade that was being rolled out on LTE cell towers across the entire network. The operation teams had noticed contrasting performance impacts across cell towers. We used Mercury to confirm that some cell towers were experiencing a performance degradation in data throughput whereas other cell towers had no negative impact on data throughput. We automatically identified the cell towers that were serving a large number of users and carrying higher traffic were experiencing degradation in LTE data through-put. We confirmed our findings with the operation teams. It turned out that the new software version was unable to handle high traffic on specific carrier frequencies. Table 1 shows the accuracy of detection across different diagnosis algorithms for five case studies. All algorithms except ours miss some case studies. Moreover, as we will show in Section 4, the gap between our algorithm and the existing algorithms further increases with the number of important features.

TABLE 1

Accuracy of diagnosis algorithms across five case studies.

| New Change Roll out | Info. Gain | Fischer Score | L1 Norm | L2 Norm |
|---|---|---|---|---|
| 100% | 60% | 80% | 40% | 80% |

Figure 4:
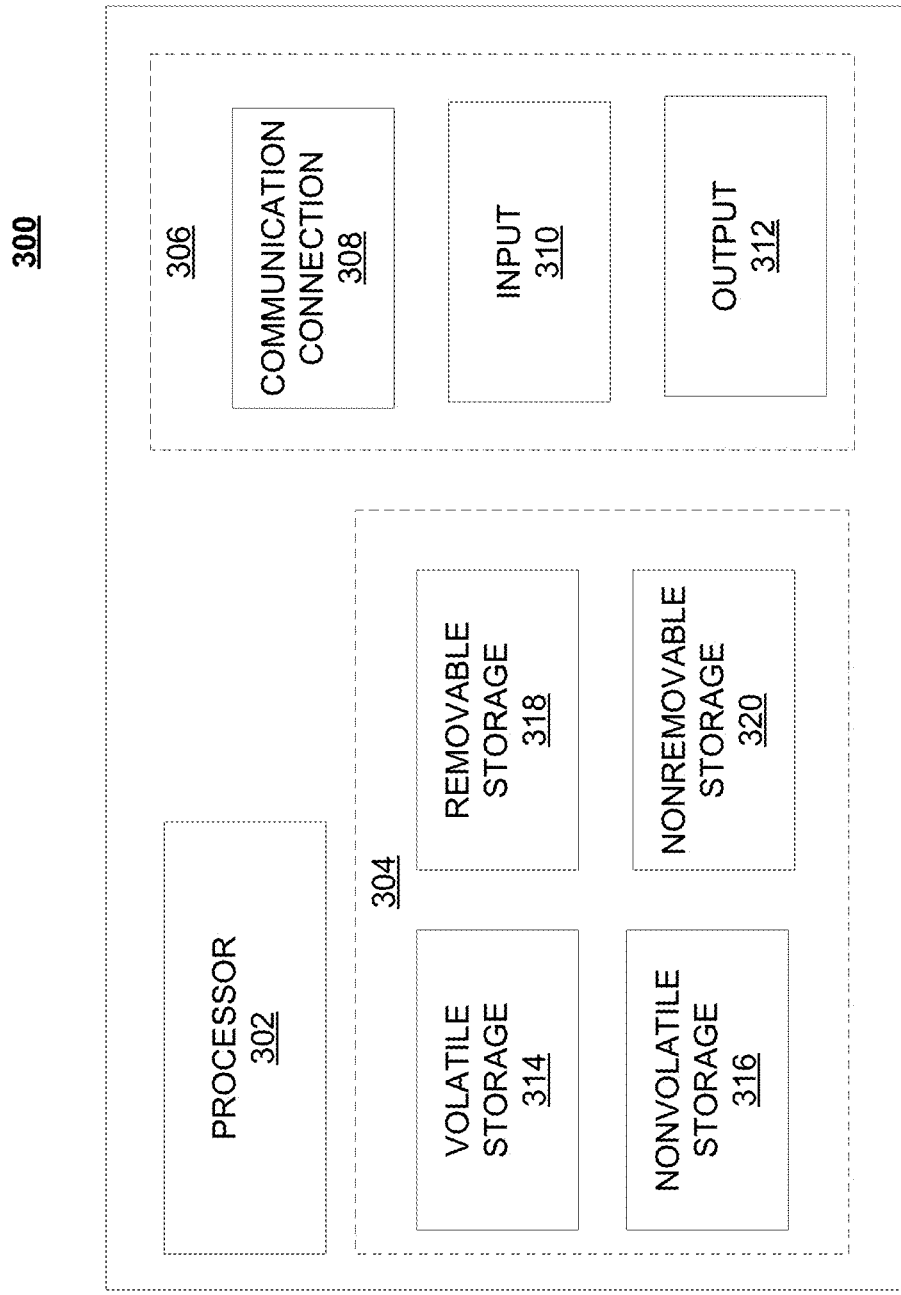
FIG. 4 illustrates a schematic of an exemplary network device.

FIG. 4 is a block diagram of network device 300 that may be connected to or comprise a component of telecommunications system 600. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
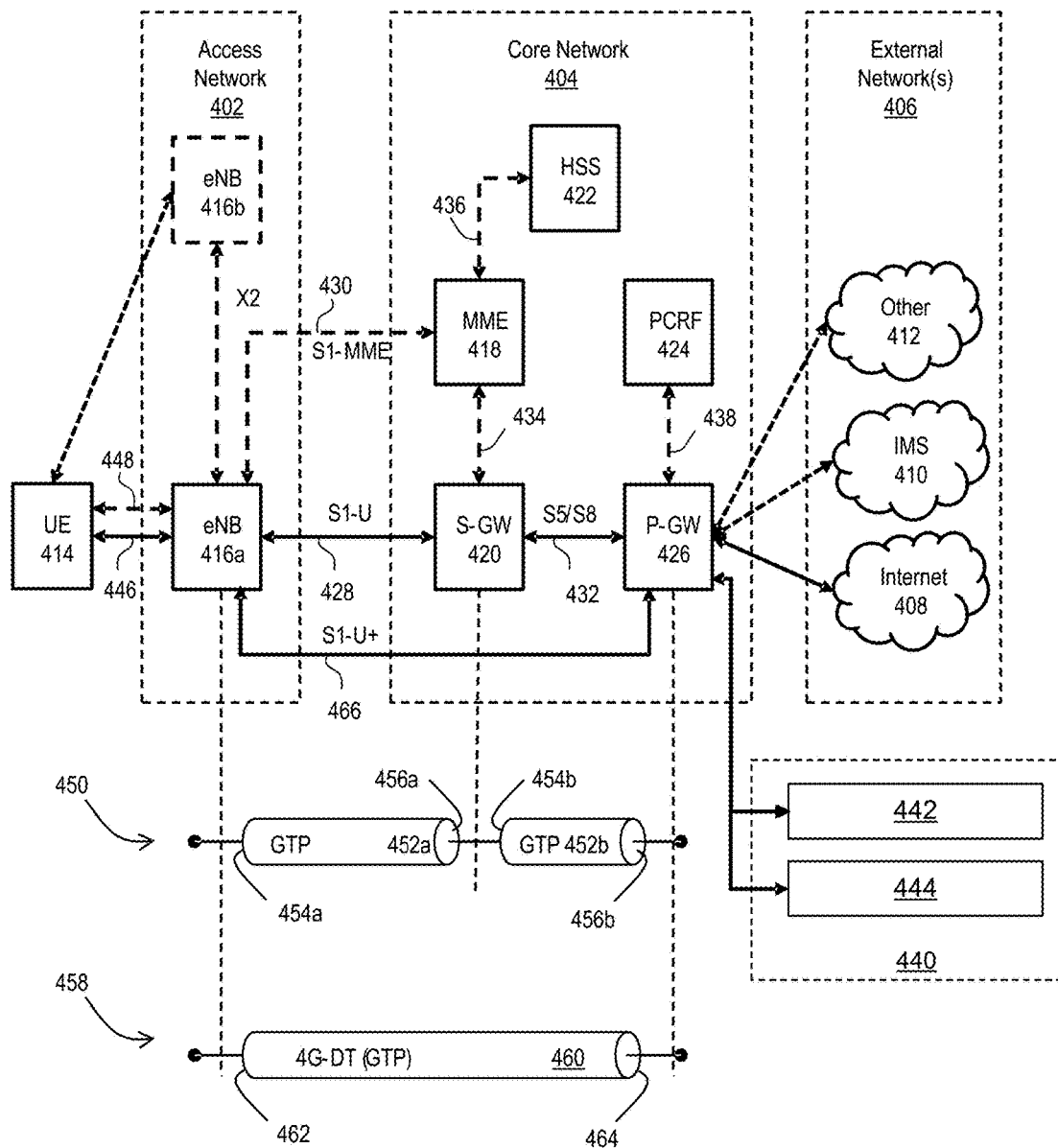
FIG. 5 illustrates an exemplary communication system that provides wireless telecommunication services over wireless communication networks.

FIG. 5 illustrates a functional block diagram depicting one example of an LTE-EPS network architecture 400 that may implement change rollout of the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 5. In other words, either or both of access network 402 and the core network 404 can include additional network elements that are not shown, such as various routers, switches and controllers. In addition, although FIG. 5 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 5. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 6:
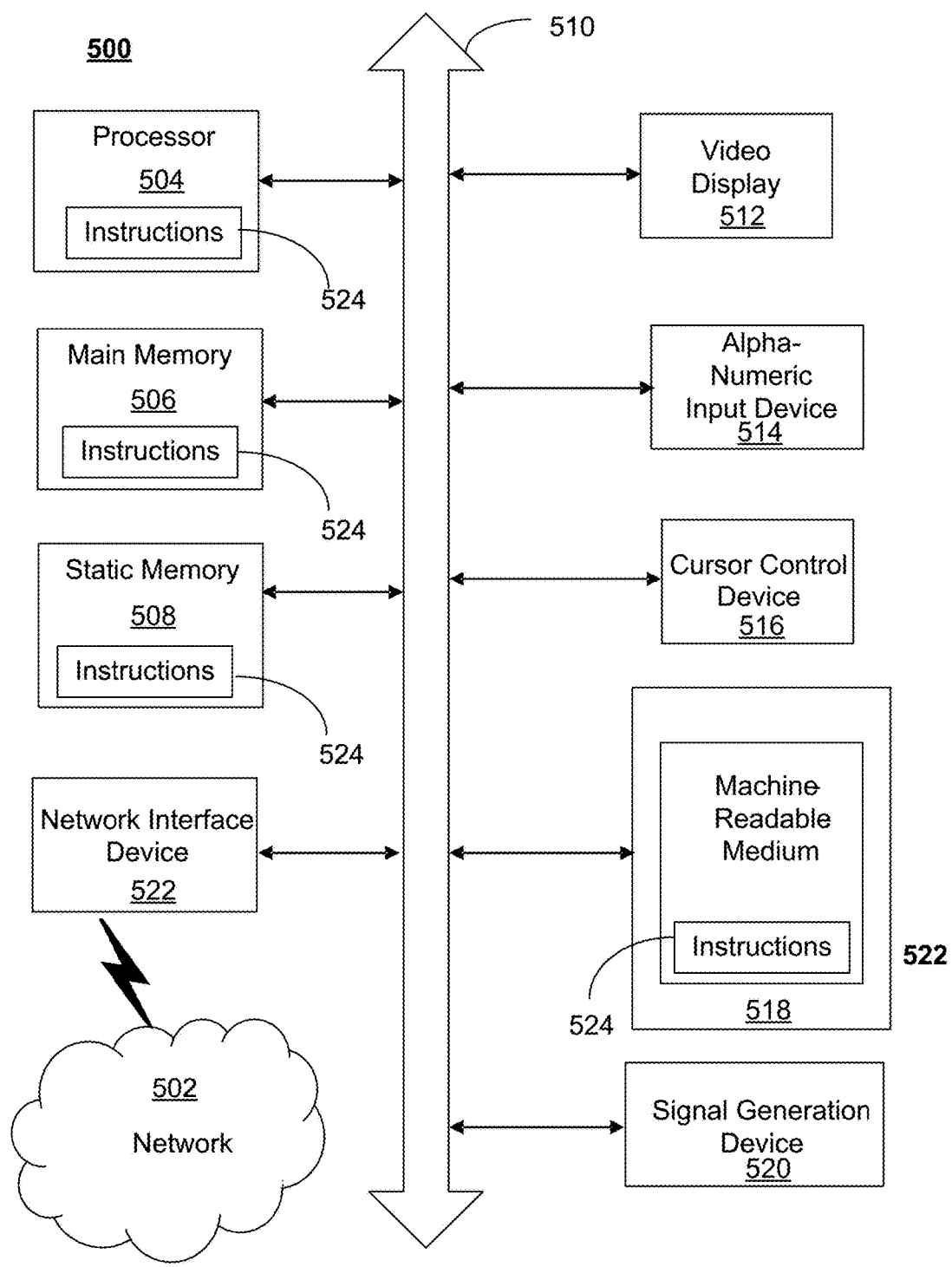
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described for implementing change rollout of the current disclosure (e.g., FIG. 1 through FIG. 3). One or more instances of the machine can operate, for example, as server 615, WTRU 602, base station 616, and other devices of FIG. 7 or other FIGs. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7:
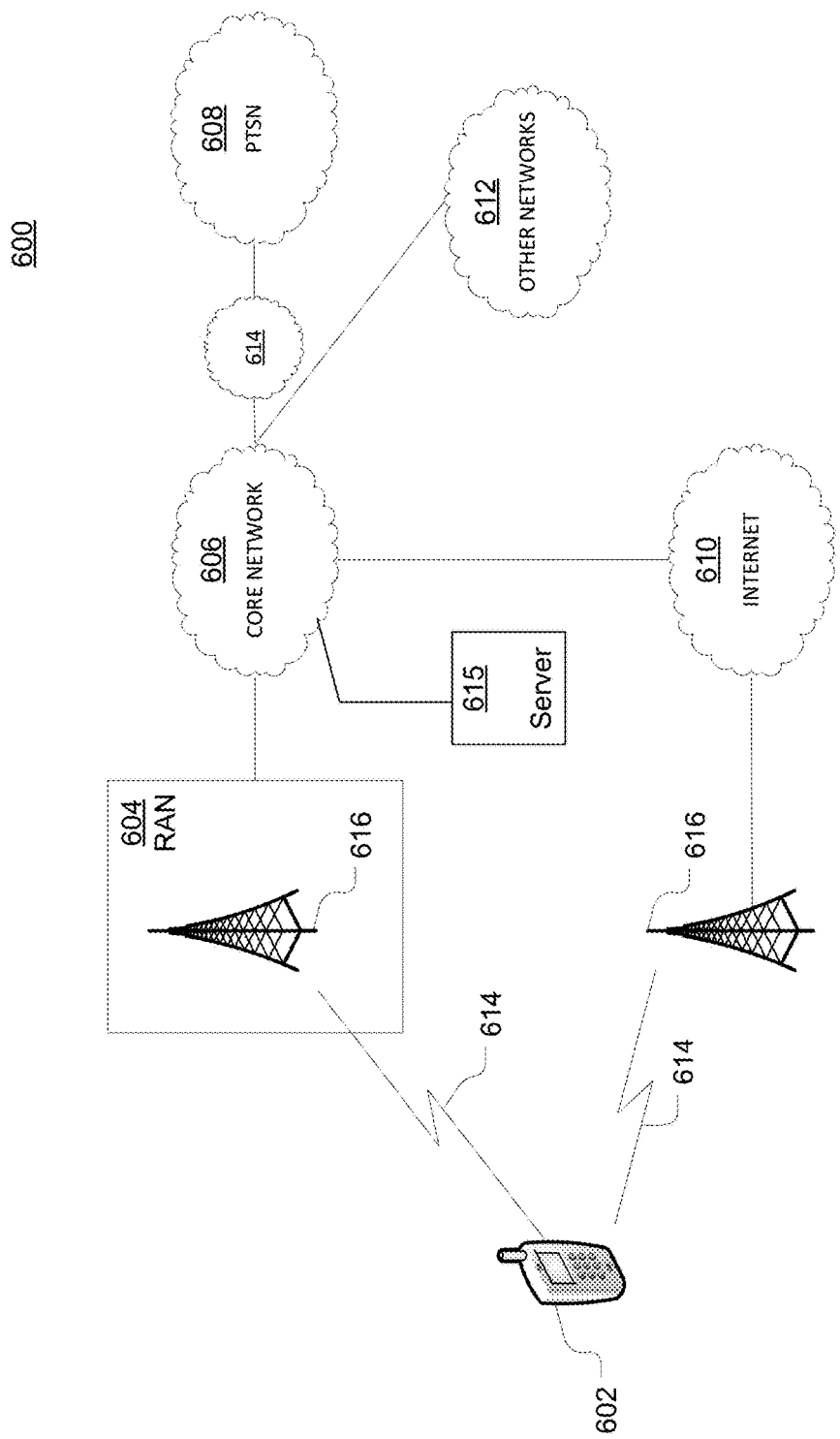
FIG. 7 illustrates an exemplary telecommunications system in which the disclosed methods and processes may be implemented.

As shown in FIG. 7, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 7, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 7, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology. Server 615 is communicatively connected with core network 606, RAN 604, WTRUs 602, base station 616, or other devices in telecommunication system 600. Server 615 may process any or all steps of FIG. 1, FIG. 2, or FIG. 3. In an example, server 615 may automatically receive information that includes a nearly exhaustive list of features for entire or portion of telecommunications system 600 that is supposed to be upgraded. Server 615 may select devices, upgrade devices, and assess devices and significant features, among other things as discussed herein. All or some of the steps of FIG. 1, FIG. 2, and FIG. 3 may be performed on server 615 or distributed across multiple devices.

Figure 8:
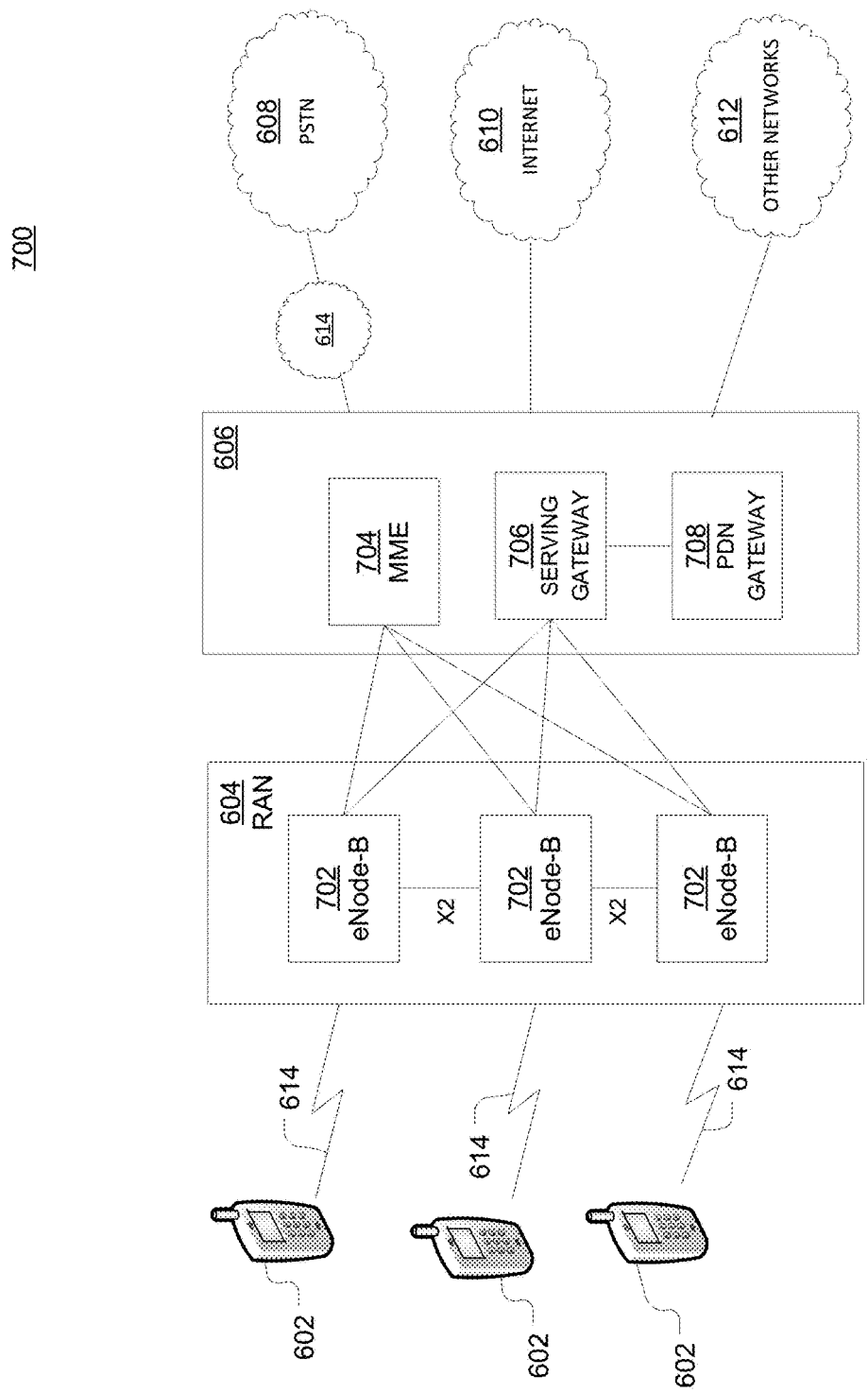
FIG. 8 illustrates an example system diagram of a radio access network and a core network.

FIG. 8 is an example system 400 including RAN 604 and core network 606 that may implement change rollout of the current disclosure. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 8 eNode-Bs 702 may communicate with one another over an X2 interface.

Core network 606 shown in FIG. 8 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 9:
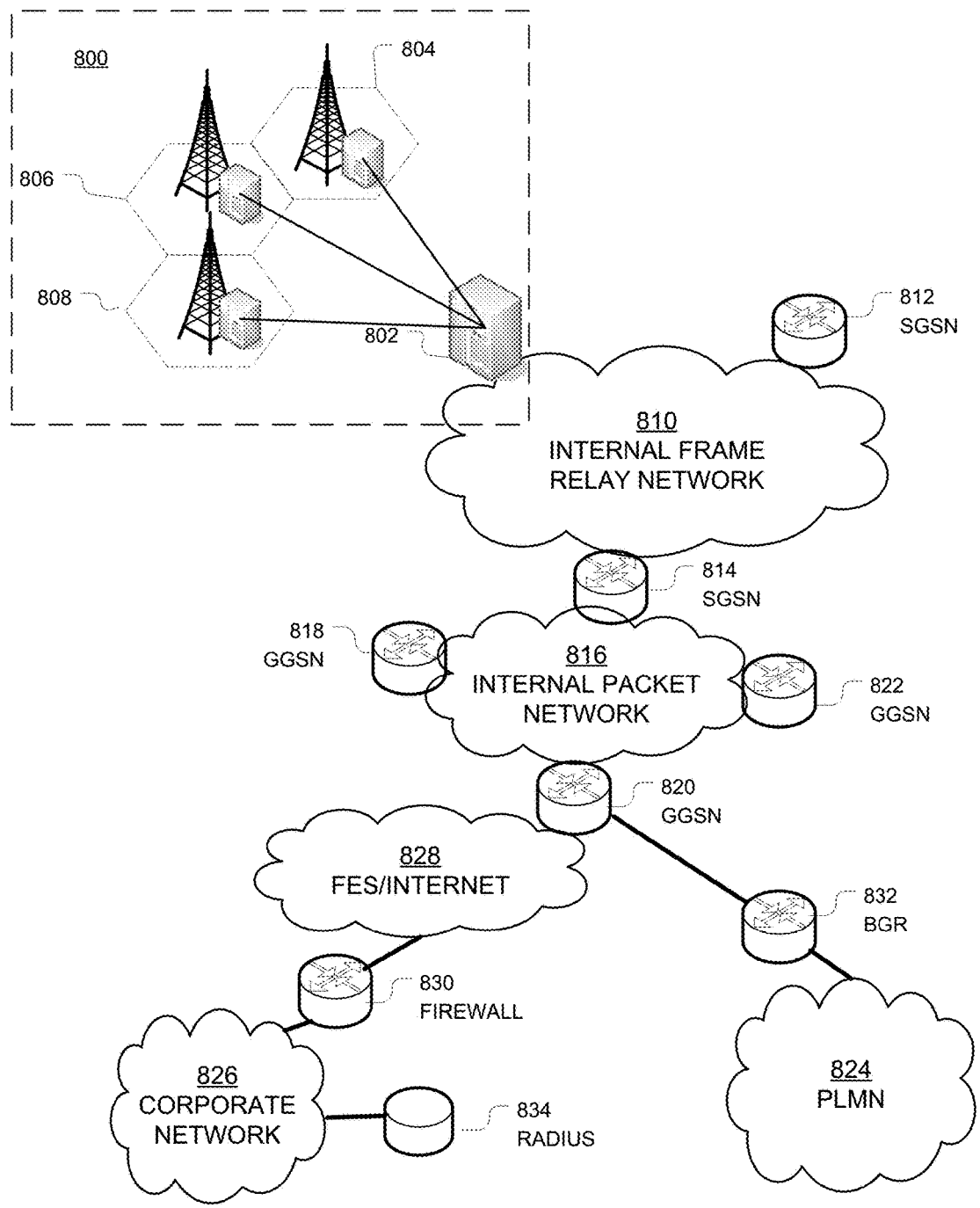
FIG. 9 depicts an overall block diagram of an example packet-based mobile cellular network environment, such as a general packet radio service (GPRS) network.

FIG. 9 depicts an overall block diagram of an example packet-based mobile cellular network environment, such as a GPRS network that may implement change rollout of the current disclosure. In the example packet-based mobile cellular network environment shown in FIG. 9, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830.

PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 10:
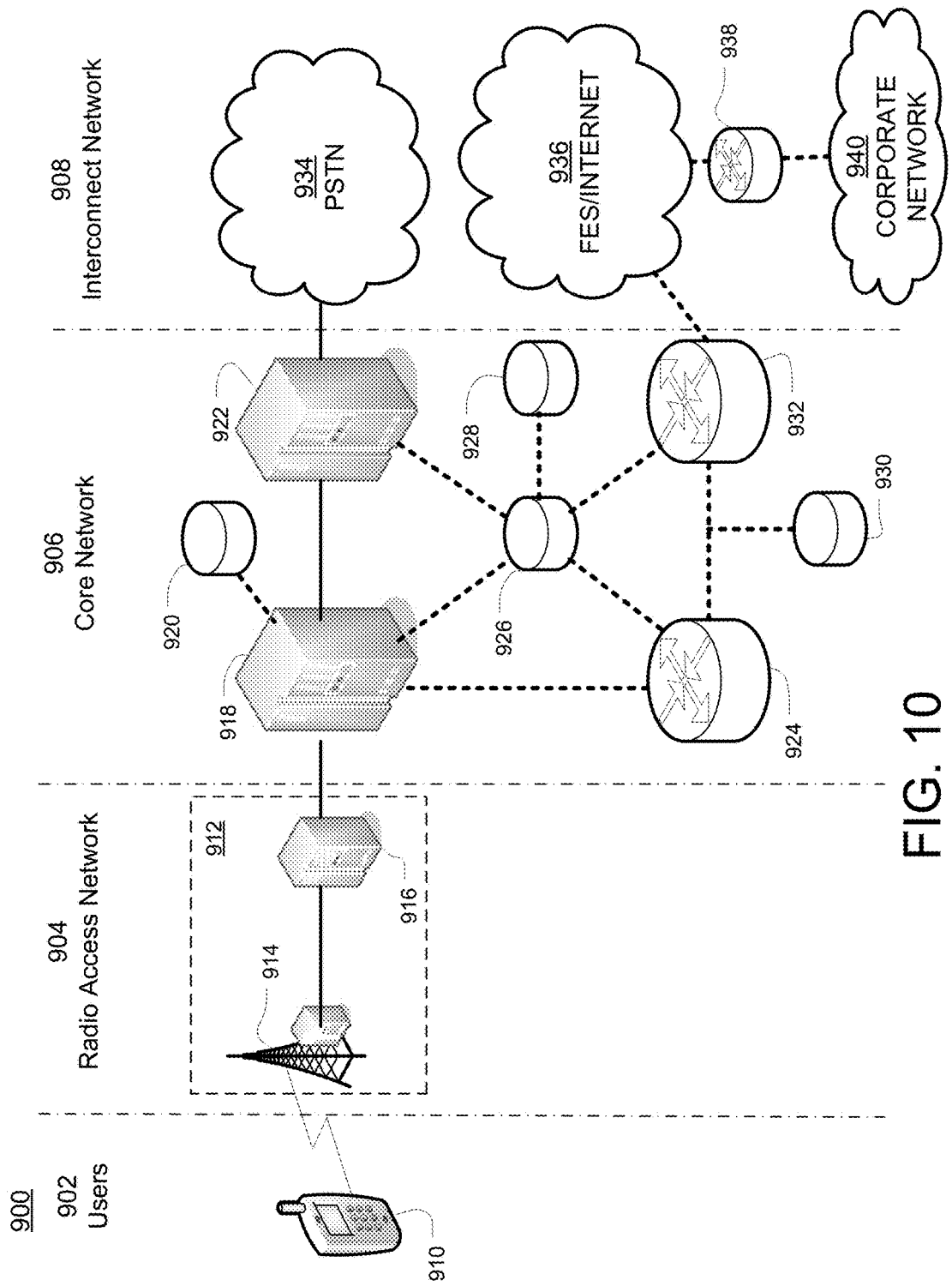
FIG. 10 illustrates an exemplary architecture of a GPRS network.

FIG. 10 illustrates an architecture of a typical GPRS network 900 as described herein that may implement change rollout of the current disclosure. The architecture depicted in FIG. 10 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 10. In an example, device 910 comprises a communications device (e.g., network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 10, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 10, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 11:
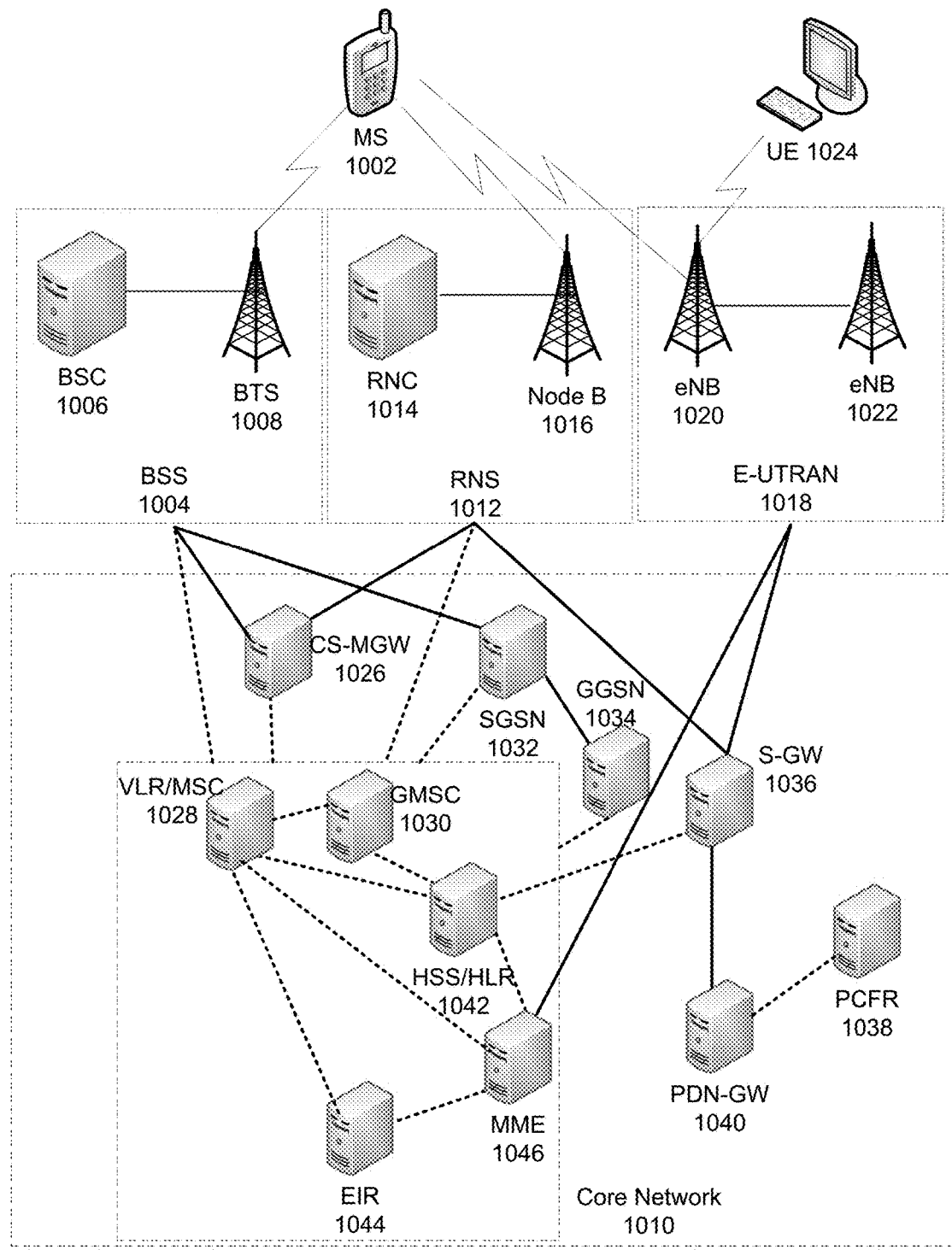
FIG. 11 is a block diagram of an exemplary public land mobile network (PLMN).

FIG. 11 illustrates a PLMN block diagram view of an example architecture of a telecommunications system that may implement change rollout of the current disclosure. In FIG. 11, solid lines may represent user traffic signals, and dashed lines may represent support signaling. MS 1002 is the physical equipment used by the PLMN subscriber. For example, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile phone, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—change rollout of wireless or other networks—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A server comprising:
a processor; and
a memory coupled with the processor, the memory comprising executable instructions that when executed by the processor cause the processor to effectuate operations comprising:
generating a first list of a plurality of features based on a hamming distance, the first list of the plurality of features associated with a communications network;
determining a first plurality of test locations based on the first list of the plurality of features, the test locations comprising a plurality of upgradable devices;
providing instructions to upgrade the first plurality of test locations;
responsive to the upgrade, assessing performance of the first plurality of test locations; and
based on the performance of the first plurality of test locations, determining a second list of the plurality of features, the second list a subset of the first list.

2. The server of claim 1, wherein the generating the first list of the plurality of features further comprises: determining a second subset list of the first list based on a first maximum minimum hamming distance over the first subset list.

3. The server of claim 2, wherein the first list comprises a third subset list of the first list, wherein the third subset list is based on a second maximum minimum hamming distance from the first subset list and the second subset list.

4. The server of claim 1, wherein the hamming distance is weighed based on a threshold number of test locations with a feature in the first list.

5. The server of claim 1, wherein the first list comprises a cell search associated feature.

6. The server of claim 1, wherein the first list comprises an uplink noise associated feature or physical resource block utilization associated feature.

7. The server of claim 1, wherein the generating the first list of the plurality of features further comprises: discretizing to numerical values a first subset list of the first list.

8. The server of claim 1, wherein the generating the first list of the plurality of features further comprises: reducing a number of features based clustering features into equivalence classes.

9. The server of claim 1, wherein the upgrade comprises a change of software or hardware in the plurality of test locations.

10. The server of claim 1, further operations comprising determining a second plurality of test locations based on the second list of the plurality of features.

11. A computer readable storage medium comprising computer executable instructions that when executed by a computing device cause said computing device to effectuate operations comprising:
generating a first list of a plurality of features based on a hamming distance, the first list of the plurality of features associated with a communications network;
determining a first plurality of test locations based on the first list of the plurality of features, the test locations comprising a plurality of upgradable devices;
providing instructions to upgrade the first plurality of test locations;
responsive to the upgrade, assessing performance of the first plurality of test locations; and
based on the performance of the first plurality of test locations, determining a second list of the plurality of features, the second list a subset of the first list.

12. The computer readable storage medium of claim 11, wherein the generating the first list of the plurality of features further comprises: determining a second subset list of the first list based on a first maximum minimum hamming distance over the first subset list.

13. The computer readable storage medium of claim 12, wherein the first list comprises a third subset list of the first list, wherein the third subset list is based on a second maximum minimum hamming distance from the first subset list and the second subset list.

14. The computer readable storage medium of claim 11, wherein the hamming distance is weighed based on a threshold number of test locations with a feature in the first list.

15. The computer readable storage medium of claim 11, wherein the first list comprises a power control associated feature.

16. A method comprising:
generating, by a server, a first list of a plurality of features based on a hamming distance, the first list of the plurality of features associated with a communications network;
determining a first plurality of test locations based on the first list of the plurality of features, the test locations comprising a plurality of upgradable devices;
providing instructions to upgrade the first plurality of test locations;
responsive to the upgrade, assessing performance of the first plurality of test locations;
based on the performance of the first plurality of test locations, determining a second list of the plurality of features, the second list a subset of the first list;
determining a second plurality of test locations based on the second list of the plurality of features;
providing instructions to upgrade the second plurality of test locations;
responsive to the upgrade, assessing performance of the second plurality of test locations; and
based on assessing performance of the second plurality of test locations, providing a feature of the second list that is the root cause of a degradation of service of the communications network.

17. The method of claim 16, wherein the generating the first list of the plurality of features further comprises: determining a second subset list of the first list based on a first maximum minimum hamming distance over the first subset list.

18. The method of claim 17, wherein the first list comprises a third subset list of the first list, wherein the third subset list is based on a second maximum minimum hamming distance from the first subset list and the second subset list.

19. The method of claim 16, wherein the hamming distance is weighed based on a threshold number of test locations with a feature in the first list.

20. The method of claim 16, wherein the first list comprises a medium access layer associated feature.

* * * * *